United States Patent Office 2,997,110
Patented Aug. 22, 1961

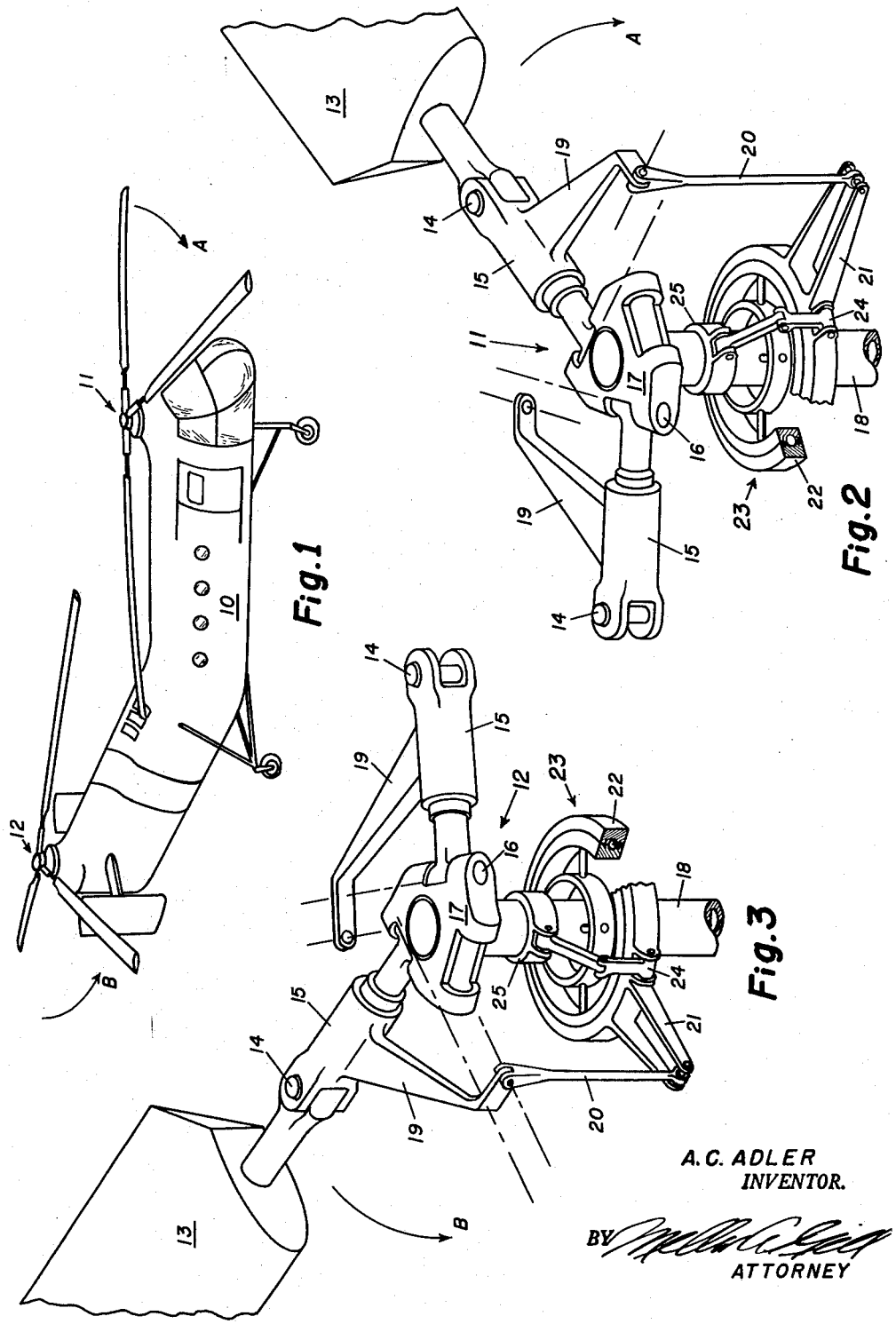

2,997,110
TANDEM ROTOR HELICOPTER
Abraham C. Adler, Snyder, N.Y., assignor, by mesne assignments, to Boeing Airplane Company, Seattle, Wash., a corporation of Delaware
Filed Jan. 10, 1958, Ser. No. 708,169
11 Claims. (Cl. 170—135.24)

This invention relates to aircraft and more particularly to helicopters of the tandem rotor type.

It is the primary object of the present invention to provide means to longitudinally stabilize such helicopters during forward flight.

It is a more specific object to provide the rotors of such helicopters with means to vary differentially and automatically the thrust of said rotors whenever the helicopter pitches upwardly or downwardly to thereby cause the helicopter to return to its original pitch heading.

Since the thrust of a rotor varies with the pitch setting and hence the angle of attack of the rotor blades, a change in rotor angle of attack, which in turn results in a change in angle of attack of the rotor blades, results in a change in rotor thrust. If the blades of the rotor are of the flapping type, i.e., mounted upon the rotor head by means of a horizontal hinge, an increase in rotor thrust will be accompanied by upward flapping of the blades. By mounting the blades upon the rotor head in such manner that upward flapping of the blades is accompanied by a reduction in pitch setting, means are provided for automatically reducing the thrust of the rotor whenever the rotor angle of attack increases. Such pitch to flap coupling is usually referred to as a positive delta-3. Similarly, by mounting the blades upon the rotor head in such manner that upward flapping of the blades is accompanied by an increase in pitch setting, means are provided for automatically increasing the thrust of the rotor whenever the rotor angle of attack increases. Such pitch to flap coupling is usually referred to as a negative delta-3. Similar pitch to flap coupling may be achieved by incorporating means in the blade pitch control linkage to change the pitch of the blades in response to flapping.

Accordingly, it is an object of the present invention to provide the rotors of a tandem rotor helicopter with delta-3.

It is a further object to provide the rotors of a tandem rotor helicopter with differential delta-3 whereby the delta-3 of the front rotor is different from that of the rear rotor. Such arrangement contemplates a pitch to flap coupling in the front rotor different from that in the rear rotor whereby the change in thrust of the front rotor is different from that of the rear rotor with changes in angle of attack of the rotors.

It is a further object to provide the front rotor of such helicopter with means to reduce automatically the thrust of said front rotor whenever the helicopter pitches upwardly, and/or to provide the rear rotor of such helicopter with means to increase automatically the thrust of said rear rotor whenever the helicopter pitches upwardly to thereby return the helicopter to its original pitch heading.

It is a further object to provide means in the pitch control linkage of the rotors of a tandem rotor helicopter to reduce the pitch of the blades of the front rotor and/or to increase the pitch of the blades of the rear rotor in response to upward flapping of the blades when the helicopter pitches upwardly to thereby return the helicopter to its original pitch heading.

Other objects of the invention, as well as the advantages thereof, will become apparent from the following description when read in conjunction with the accompanying drawings in which:

FIG. 1 is a perspective view of a tandem rotor helicopter incorporating the present invention;

FIG. 2 is an enlarged perspective view of a portion of the front rotor and a portion of its pitch control linkage; and FIG. 3 is an enlarged perspective view of a portion of the rear rotor and a portion of its pitch control linkage.

As shown in FIG. 1, the helicopter 10 is provided with front and rear rotors 11 and 12 driven in opposite directions, as shown by the arrows A and B, by a power plant and associated transmission means contained within the fuselage of the helicopter. Each of the rotors comprises identical mechanism and like parts in FIGS. 2 and 3 therefore bear the same reference numerals. For the sake of clarity, only a portion of each rotor and its pitch control mechanism is shown in FIGS. 2 and 3.

Referring to these figures, it is seen that the rotor blades 13 are mounted by means of a lead-lag or vertical pin 14 to a pitch bearing member 15 in turn mounted by means of a horizontal pin 16 to the rotor hub 17 which is fixedly attached to and rotated by the vertical drive shaft 18. The pitch bearing member 15 is provided with a pitch arm 19 which at its outer extremity is pivotally connected to a pitch link 20. The other end of the pitch link 20 is pivotally connected to an outwardly extending lug member 21 carried by the outer rotatable ring 22 of the swash plate 23.

A scissors linkage 24 is pivotally connected to the outer ring 22 and to a collar 25 which is fixedly attached to and rotated by the drive shaft 18. There are thus provided means permitting the blades 13 to lead or lag about the vertical pins 14 and to flap in the vertical about the horizontal pins 16 in response to the aerodynamic and centrifugal loads thereon, and for controlling the pitch of the blades about their longitudinal axis in response to movement of the swash plate 23.

Means for positioning the swash plate 23 to provide for the collective pitch change of the blades as well as to provide both lateral and longitudinal cyclic pitch change to the blades, although not shown herein, are fully shown in the copending application of Paul J. Dancik, Serial No. 502,456, filed April 19, 1955 and issued November 18, 1958 as Patent No. 2,860,711.

With particular reference to the front rotor 11 shown in FIG. 2, it will be seen that the outer extremities of the pitch arms 19 are outboard of the axis of the horizontal pins 16 and any flapping of the blades 13 of the front rotor will be accompanied by a change in pitch of those blades. With particular reference to the rear rotor 12 shown in FIG. 3, it will be seen that the outer extremities of the pitch arms 19 are inboard of the axis of the horizontal pins 16 and any flapping of the blades 13 of the rear rotor will be accompanied by a change in pitch of those blades. By constructing the pitch arms 19 of the front rotor such that their outer extremities are outboard of the horizontal pins 16, and constructing the pitch arms 19 of the rear rotor such that their outer extremities are inboard of the horizontal pins 16, upward flapping of the blades 13 will result in a decrease in pitch of the blades of the front rotor and an increase in pitch of the blades of the rear rotor. Conversely, downward flapping of the blades will result in an increase in pitch of the blades of the front rotor and a decrease in pitch of the blades of the rear rotor.

If an upward gust should cause the helicopter 10 to pitch upwardly during forward flight, the angle of attack of both rotors will increase which in turn results in an increase in thrust of the rotors and hence upward flapping of the blades or increased coning. The upward flapping of the blades of the front rotor is accompanied by a reduction in pitch of those blades while the upward flapping of the blades of the rear rotor is accompanied by an increase in pitch of those blades, thereby reducing the thrust of the front rotor and further increasing the thrust of the rear rotor to cause the nose of the helicopter to drop. Similarly, if a downward gust should cause the helicopted 10 to pitch downwardly during forward flight, the angle of attack of both rotors will decrease which in turn results in a decrease in thrust of the rotors and hence downward flapping of the blades or decreased coning. The downward flapping of the blades of the front rotor is accompanied by an increase in pitch of those blades while the downward flapping of the blades of the rear rotor is accompanied by a decrease in pitch of those blades, thereby increasing the thrust of the front rotor and further decreasing the thrust of the rear rotor to cause the nose of the helicopter to raise.

Although the rotors 11 and 12 are shown as having a positive and a negative delta-3 respectively, it is to be understood that the same stabilizing effect, although of lesser degree may be obtained where either rotor is provided with zero delta-3, i.e., the outer extremities of the pitch arms 19 of cne rotor are aligned with the axes of the horizontal pins 16 of that rotor, or even where the rear rotor is provided with a positive delta-3, provided however that such positive delta-3 is less than that of the front rotor. In this latter instance, the decrease in thrust of the front rotor with upward pitching of the helicopter during forward flight is greater than the decrease in thrust of the rear rotor and hence the nose of the helicopter will drop to return the aircraft to its original pitch heading. If desired, the front rotor may be provided with a negative delta-3, provided however, that such negative delta-3 is not as great as that of the rear rotor. In this instance, the increase in thrust of the front rotor with upward pitching of the helicopter during forward flight would be less than the increase in thrust of the rear rotor and hence the tail of the helicopter would raise to return the aircraft to its original pitch heading accordingly, the present invention embraces all instances where the delta-3 of the front rotor, whether it be positive, zero or negative, is algebraically greater than that of the rear rotor, whether it be positive, zero or negative.

By way of a further and more specific example, the delta-3 of the front rotor may be a plus 20, i.e., the decrease in pitch with upward flapping is equal to that obtained by offsetting the axis of the horizontal pins 16 by 20 degrees, while the delta-3 of the rear rotor may be negative, zero or even positive, provided it is less than plus 20. On the other hand, the delta-3 of the rear rotor may be a minus 20, i.e., the increase in pitch with upward flapping is equal to that obtained by offsetting the axis of the horizontal pins 16 by 20 degrees, while the delta-3 of the front rotor may be positive, zero or even negative provided it is algebraically greater than minus 20.

Although shown and described in what is believed to be the most practical and preferred embodiments, it is apparent that departures from the specific apparatus shown will suggest themselves to those skilled in the art and may be made without departing from the spirit and scope of the invention. I therefore do not wish to restrict myself to the particular forms of construction illustrated and described, but desire to avail myself of all modifications that may fall within the scope of the appended claims.

Having thus described my invention, what I claim is:

1. In a helicopter, fore and aft sustaining rotors provided with blades mounted on flapping axes adapted for pitch change about their longitudinal axes, a swash plate associated with each of said rotors, means operatively connecting each of said swash plates with the blades of their respective rotors to effect a pitch change of the blades in response to movements of said swash plates, said operatively connecting means being offset from said flapping axes to cause a change in thrust of the fore rotor different from that of the aft rotor with changes in angle of attack of said blades on flapping movements thereof caused by the flapping of said blades.

2. The apparatus set forth in claim 1 wherein the change in thrust of the fore rotor is less than that of the aft rotor with increasing angle of attack of said rotors.

3. The apparatus set forth in claim 1 wherein the change in thrust of the fore rotor is greater than that of the aft rotor with increasing angle of attack of said rotors.

4. The apparatus set forth in claim 1 wherein the change in thrust of the fore rotor is less than that of the rear rotor with decreasing angle of attack of said rotors.

5. The apparatus set forth in claim 1 wherein the change in thrust of the fore rotor is greater than that of the aft rotor with decreasing angle of attack of said rotors.

6. In a helicopter, at least one sustaining rotor located near the aft end thereof, and at least one sustaining rotor located near the forward end thereof, said rotors having a plurality of rotor blades, pitch changing means operatively connected to said blades, flapping hinge means for said blades, a pivotal connection to said pitch changing means located at a position offset from the axis of said flapping hinge, thereby providing a delta-3 for each blade, the degree of said offset for the blades of the forward rotor being greater than the degree of offset for the blades of the aft rotor, whereby the delta-3 of the forward rotor is greater than the delta-3 of the aft rotor.

7. In a helicopter, at least one fore and one aft sustaining rotor, said rotors having a plurality of rotor blades, pitch changing means operatively connected to said blades, flapping hinge means for said blades, a pivotal connection to said pitch changing means located at a position offset from the axis of said flapping hinge, thereby providing a delta-3 for each blade, the degree of said offset for the blades of the forward rotor being greater than the degree of offset for the blades of the aft rotor, whereby the delta-3 of the forward rotor is greater than the delta-3 of the aft rotor.

8. In a helicopter, a sustaining rotor located near the aft end thereof having a plurality of rotor blades, pitch changing means operatively connected to said blades, flapping hinge means for said blades, a pivotal connection to said pitch changing means located at a position substantially on the axis of said flapping hinge, and a sustaining rotor located near the forward end having a plurality of rotor blades, pitch changing means operatively connected to said blades, flapping hinge means for said blades, a pivotal connection to said pitch changing means located at a position offset from the axis of said flapping hinge whereby the pitch of said blades is decreased on an upward flapping motion of said blades on said flapping hinge, thereby providing said forward rotor with positive delta-3.

9. In a helicopter, a sustaining rotor located near the forward end thereof having a plurality of rotor blades, pitch changing means operatively connected to said blades, flapping hinge means for said blades, a pivotal connection to said pitch changing means located at a position substantially on the axis of said flapping hinge, and a sustaining rotor located near the aft end thereof having a plurality of rotor blades, pitch changing means operatively connected to said blades, flapping hinge means for said blades, a pivotal connection to said pitch changing means located at a position offset from the axis of said flapping hinge whereby the pitch of said blades is increased on an upward flapping motion of said blades on said flapping hinge, thereby providing said aft rotor with negative delta-3.

10. The apparatus set forth in claim 9 wherein the sustaining rotor located near the forward end of the helicopter is provided with a plurality of rotor blades, pitch changing means operatively connected to said blades, flapping hinge means for said blades, a pivotal connection to said pitch changing means located at a position offset from the axis of said flapping hinge whereby the pitch of said blades is decreased on an upward flapping motion of said blades on said flapping hinge, thereby providing said forward rotor with positive delta-3.

11. In a helicopter, a sustaining rotor located near the aft end therof and a sustaining rotor located near the forward end thereof having a plurality of rotor blades, pitch changing means operatively connected to said blades, flapping hinge means for said blades, a pivotal connection to said pitch changing means located at a position offset from the axis of said flapping hinge whereby the pitch of said blades is decreased on an upward flapping motion of said blades on said flapping hinge, thereby providing said rotors with positive delta-3, the offset of said forward rotor being greater than the offset of said aft rotor whereby the positive delta-3, of said last mentioned sustaining rotor is made greater than that of said first mentioned sustaining rotor.

References Cited in the file of this patent

UNITED STATES PATENTS

| | | |
|---|---|---|
| 2,670,051 | Hohenemser | Feb. 23, 1954 |
| 2,753,004 | Jovanovich | July 3, 1956 |